United States Patent [19]

Abe et al.

[11] Patent Number: 4,491,266

[45] Date of Patent: Jan. 1, 1985

[54] MULTI-LAYER PADDING WELDING METHOD

[75] Inventors: Riichi Abe, Hiratsuka; Katsuji Tsuruta; Seiji Tsujikado, both of Isehara, all of Japan

[73] Assignee: Kabushiki Kaisha Komatsu Seisakusho, Tokyo, Japan

[21] Appl. No.: 318,951

[22] Filed: Nov. 6, 1981

[30] Foreign Application Priority Data

Sep. 10, 1980 [JP] Japan ................................ 55-125745

[51] Int. Cl.³ ............................................. B23K 31/02
[52] U.S. Cl. ....................................... 228/225; 228/45; 228/102; 219/124.34; 901/42
[58] Field of Search ................. 228/45, 225, 226, 102; 219/124.34, 125.1, 125.11, 124.22; 364/513, 477; 901/42

[56] References Cited

U.S. PATENT DOCUMENTS

| | | | |
|---|---|---|---|
| 4,025,838 | 5/1977 | Watanabe | 364/513 X |
| 4,140,953 | 2/1979 | Dunne | 318/571 X |
| 4,287,459 | 9/1981 | Dahlström | 364/513 X |
| 4,380,695 | 4/1983 | Nelson | 219/124.34 X |
| 4,385,358 | 5/1983 | Ito et al. | 364/513 |

FOREIGN PATENT DOCUMENTS

| | | | |
|---|---|---|---|
| 141971 | 11/1981 | Japan | 219/124.34 |
| 277431 | 4/1962 | Netherlands | 228/225 |

Primary Examiner—Nicholas P. Godici
Assistant Examiner—P. Weston Musselman, Jr.
Attorney, Agent, or Firm—Spensley Horn Jubas & Lubitz

[57] ABSTRACT

A method for performing multi-layer welding using a welding robot, in which welding on the second and subsequent layers is carried out by backwardly displacing the position of a torch tip by a preset value.

3 Claims, 7 Drawing Figures

MULTI-LAYER PADDING WELDING METHOD

BACKGROUND OF THE INVENTION

This invention relates to a Multi-layer padding welding method.

Welding robots are currently being developed extensively for the labor savings in welding operations, improvement in quality, improvement in environmental conditions of welders, etc. Multi-layer padding is one of the very important functions of welding operations where welding robots are employed, but it is technically difficult.

For performing multi-layer welding by a welding robot, the first layer welding path is taught first, and then the second, the third (and so forth) layer welding paths are sequentially taught. The paths of the second and subsequent layers should be taught taking the welding conditions of up to the previous layer into consideration, and as a result the center-to-center distance between the layers becomes uneven, lowering the welding accuracy.

As shown in FIG. 1, when double layer padding (groove welding) of members 5 and 6 shown in FIG. 2 is performed by a welding robot having welding torches 1 and 2, ends of welding wires 3 and 4 of the torches 1 and 2 are caused to extend toward the weld line for lengths differing by $\Delta_{L2}$ with each other and to be mutually spaced by $\Delta_{L1}$, and then the torch 1 is taught to follow the welding path of the first layer. As the torch 1 moves from the weld start point P for the distance of $\Delta L_1$ while welding the first layer, the torch 2 starts welding the second layer at the point P. When the above double layer padding is viewed from the weld line, the distance between the weld center $C_1$ of the first layer and the weld center $C_2$ of the second layer is equal to the offset $\Delta L_2$ between the ends of welding wires 3 and 4 of the welding torches 1 and 2. Accordingly, the center-to-center distance of welding between layers becomes uniform, enabling high accuracy welding.

However, this system is expensive due to the necessity of two (or more) welding torches, and the center-to-center distance $\Delta L_2$ of welding cannot be changed easily. In the case that $\Delta L_2$ is set mechanically, gaining the accuracy of that $\Delta L_2$ is difficult, and change of the values of $\Delta L_2$ requires considerable time, while if $\Delta L_2$ is set electrically or hydraulically, a servo mechanism is required for positioning, boosting the price. Furthermore, there is a problem that this method cannot be applied to multi-layer padding of a fillet weld as shown in FIG. 4.

SUMMARY OF THE INVENTION

According to the present invention, in a welding robot wherein a torch tip is controlled using a predetermined constant as a parameter so as to follow a desired trajectory, there is provided a multi-layer padding welding method comprising steps of providing a new constant which is obtained by changing said predetermined constant by a preset value, and displacing the torch tip as much as said preset value from said desired trajectory. Accordingly, an object of this invention is to provide a multi-layer padding welding method which assures high accuracy welding by eliminating the above-mentioned disadvantages of prior art.

Another object of this invention is to provide a multi-layer padding welding method for a welding robot which enables setting of the center-to-center distance of weld between weld layers at a desired value, thereby making possible multi-layer padding of high welding accuracy.

A further object of this invention is to provide a multi-layer padding welding method for a welding robot which requires shortened teaching time by enabling multi-layer padding by teaching for the first layer welding.

A still further object of this invention is to provide a multi-layer padding welding method for a welding robot which is applicable regardless of the type of joints and groove forms.

The invention will be described in more detail with reference to accompanying drawings.

DETAILED DESCRIPTION OF THE INVENTION

Figure 1:
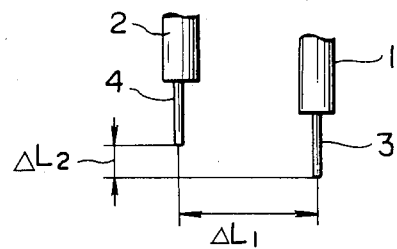
FIG. 1 shows welding torch arrangement of a prior art welding robot having two welding torches.
Figure 3:
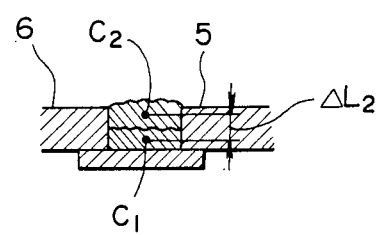
FIG. 3 is a sectional view as viewed from the direction of weld line after welding in FIG. 2.
Figure 2:
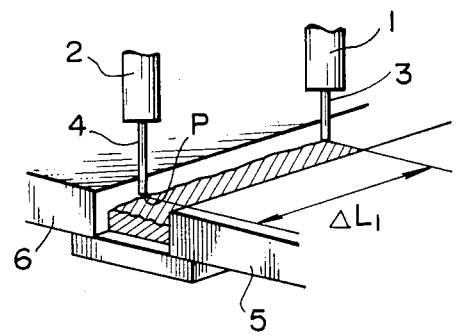
FIG. 2 is a perspective view showing the prior art welding robot in operation.
Figure 4:
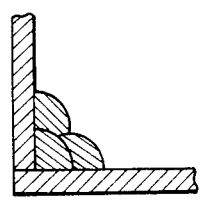
FIG. 4 is a sectional view of multi-layer padding of fillet weld.
Figure 5:
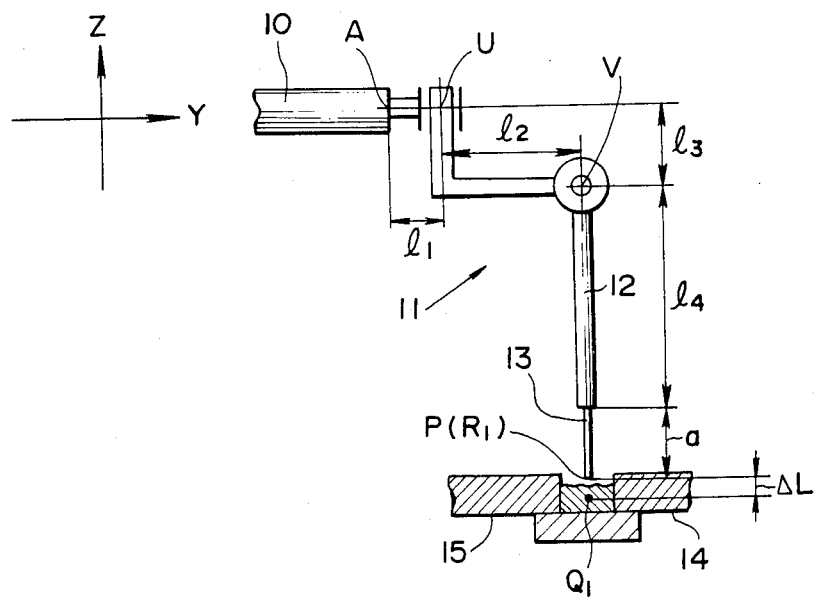
FIGS. 5 and 6 are side views of a wrist of a welding robot according to an embodiment of this invention.

Referring to FIG. 5, in which it is shown particularly a method for performing double layer padding of groove welding. If the front end point of an arm 10 of the welding robot is referred to as symbol A, a rotary axis around which a wrist 11 rotates within the X-Y plane is referred to as symbol U, a rotary axis around which the wrist 11 rotates within the Y-Z plane is referred to as symbol V, and the tip of a welding wire is referred to as symbol P, then 11, 12, 13, 14 and a are defined as follows.

11: distance from point A to rotary axis U

12: distance in the Y direction from rotary axis U to rotary axis V

13: distance in the Z direction from rotary axis U to rotary axis V

14: distance from rotary axis V to the tip of welding torch 12 a: distance from the tip of welding torch 12 to the tip of welding wire 13

The welding robot controls the tip of the welding torch 12 (or the tip P of the welding wire 13) so as to follow a desired path having the distance of each part, 11, 12, 13, 14 and a, as a constant, and the angle of the rotary axis V and the positions of point A (X,Y,Z) of the arm 10 as variables. For example, when performing groove welding on members 14 and 15 shown in FIG. 5, the angles of the rotary axes U and V are set to zero, and the robot is taught to bring the tip P of the welding wire to coincide with the welding center Q1 of the first layer. Then, Point A is moved only in the X direction orthogonal to the paper with the angles of rotary axes U and V unchanged. By doing this, the tip P of the welding wire 13 is controlled so as to follow the desired path, i.e., the path passing through the welding center Q1 of the groove of members 14 and 15.

Length information for distances l1, l2, l3, and l4 of the lower arm should be given as follows.

$$l1 = L_1$$
$$l2 = L_2$$
$$l3 = L_3$$
$$l4 = L_4 \tag{1}$$

The present invention makes possible multi-layer padding by a welding robot through the sequence control of the tip of the welding torch 12 based on the fact that the welding robot can control the tip of the welding torch 12 (or the tip P of the welding wire 13) as described above.

That is, in performing the groove welding on members 14 and 15 shown in FIG. 5, for welding the second layer, position data used for the first layer welding are used as path position data of the tip of the welding torch 12, and the length information shown in the following formulas are provided corresponding to distances l1, l2, l3, and l4 of the lower arm.

$$l1 = L_1$$
$$l2 = L_2$$
$$l3 = L_3 + \Delta L$$
$$l4 = L_4 \tag{2}$$

or $$l1 = L_1$$
$$l2 = L_2$$
$$l3 = L_3$$
$$l4 = L_4 + \Delta L \tag{3}$$

where $\Delta L$ is a distance from the weld center Q1 of the first layer to the weld center R1 of the second layer in the direction orthogonal to the weld line (direction of welding torch 12).

Based on the above, the tip P of the welding wire 13 (weld center R1 of the second layer) moves upward from the weld center Q1 of the first layer for a distance equivalent to the offset value $\Delta L$ of l3 or l4, and the second layer can be welded easily according to the path position data similar to those of the first layer.

Figure 6:
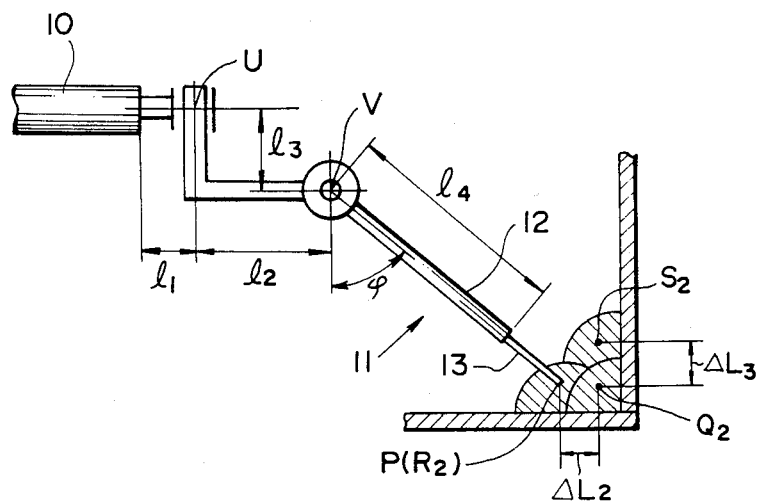

FIG. 6 shows a method for performing multi-layer padding of fillet weld by the welding robot according to this invention. In this case the angles of rotary axes U and V are fixed at $\theta$ and $\phi$ respectively, and the robot is taught so that the tip P of the welding wire 13 coincides with the weld center Q2 of the first layer. For instances l1, l2, l3, and l4 of the wrist length information in Equation (1) are given, and the tip P of the welding wire 13 is controlled so as to move along the path extending through the weld center Q2 of the first layer. For welding the second and the third layers, the path position data for the first layer welding are used as those of the tip of the welding torch 12, and length information given in the following expressions are provided for distance l1, l2, l3, and l4.

| For second layer | | For third layer | |
|---|---|---|---|
| l1 = L_1 | | l1 = L_1 | |
| l2 = L_2 + ΔL_2 | (4) | l2 = L_2 | (5) |
| l3 = L_3 | | l3 = L_3 + ΔL_3 | |
| l4 = L_4 | | l4 = L_4 | | where $\Delta L_2$ denotes the distance from the first layer weld center Q2 to the second layer weld center R2, and $\Delta L_3$ represents the distance from the first layer weld center Q2 to the third layer weld center S2.

By adding some offset value to the distance of the wrist, multi-layer padding may be performed easily.

Figure 7:
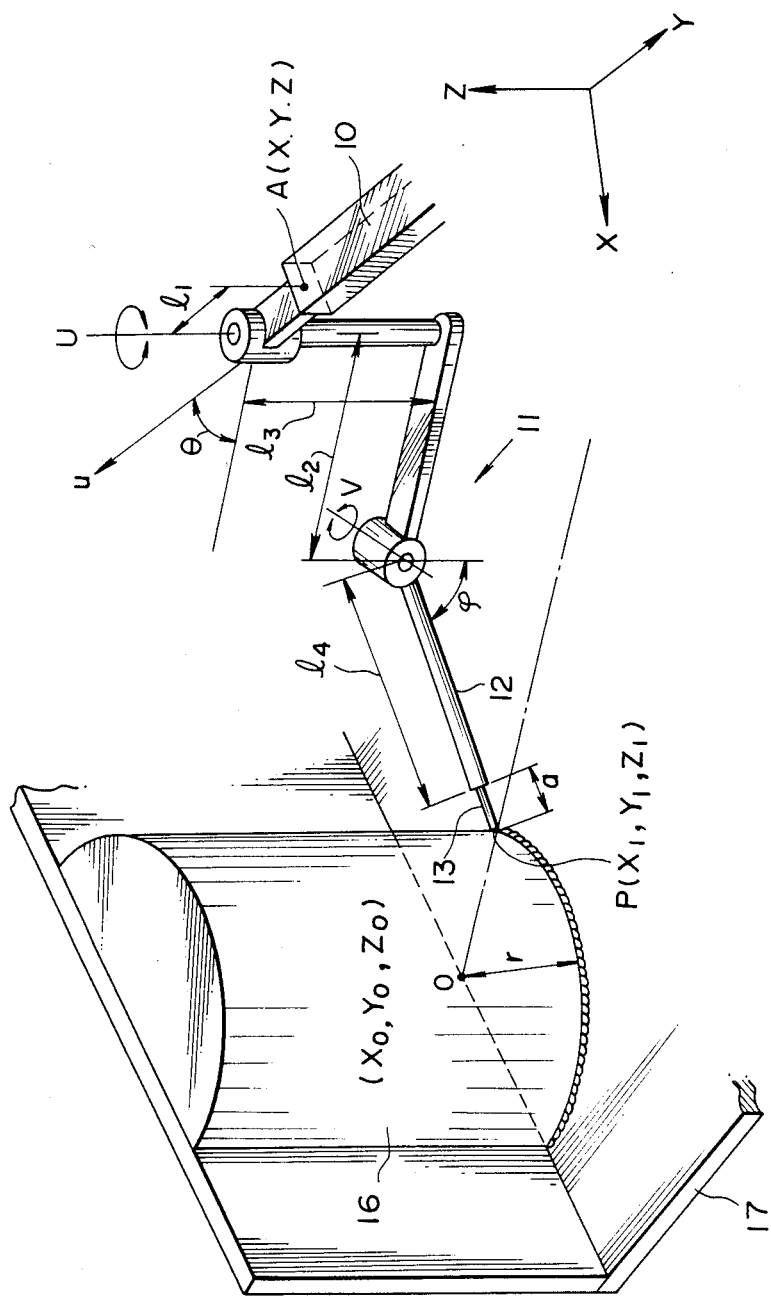
FIG. 7 is a perspective view of the wrist according to the embodiment of the invention.

Through the application of this invention, multi-layer padding of a weldment of various shapes, for example weldment 16 as shown in FIG. 7 can be made.

In orthogonal coordinate systems X, Y, and Z, a member 17 is placed parallel to the X-Y plane, Z coordinate of its surface is designated Zo, the radius of a semi-cylindrical weldment is designated r, and the center (Xo, Yo, Zo) is designated O. The tip P (X1, Y1, Z1) of the welding wire 13 is assumed to be at the weld center of the weldment 16, and the torch 12 is controlled so as to point toward the center O of the weldment 16 at all times. The angles of rotary axes U and V are assumed to be $\theta$ and $\phi$ respectively, and the end point A of the wrist 10 is indicated by (X,Y,Z).

The relationship among point A (X,Y,Z), tip P (X1, Y1, Z1) and center O (Xo, Yo, Zo) is given by the following equations.

$$(X_1 - Xo)^2 + (Y_1 - Yo)^2 = r^2 \tag{6}$$

$$Zo = Z_1 \tag{7}$$

$$X + \{(a+l4)\sin\phi + l2\}\sin\theta = X_1 \tag{8}$$

$$Y + \{(a+l4)\sin\phi + l2\}\cos\theta + l1 = Y_1 \tag{9}$$

$$Z - l3 - (a+l4)\cos\phi = Z_1 \tag{10}$$

Accordingly, if the end point A(X, Y, Z) of upper arm 10 and angles $\theta$ and $\phi$ of the rotary axes U and V are controlled so as to satisfy Equations (6) through (10), the tip P (X1, Y1, Z1) of the welding wire 13 will move along the weld center of the weldment 16. The first layer welding of the weldment 16 is performed in this way.

For welding the second layer which is shifted by the distance of $\Delta r$ in the radical r direction, length information for distance l2 should be changed from L2 to $L2 + \Delta r$ so that the second layer weld center can be shifted from the first layer center in the radial direction for the distance of $\Delta r$. When welding is performed with the weld center being shifted in the direction of the welding torch 12 for the distance of $\Delta L_4$, length information for distance l4 should be changed from L4 to $L4 + \Delta L_4$, and the positions should be controlled so as to satisfy Equations (6) and (7).

The center-to-center distance of weld between weld layers should be set properly in advance according to weld members, type of joint, groove form, etc. By sequentially feeding these set values, multi-layer padding can be made after a single teaching.

What is claimed is:

1. A multi-layer padding welding method using a welding robot having a body movable along orthogonal axes and having a wrist with two axes of rotation, a torch tip being mounted at the end of said wrist, wherein the positioning of said torch tip is controlled using a predetermined constant as a parameter so as to follow a desired trajectory, said method comprising the steps of:

conducting a teaching operation only for the first layer welding, during which teaching operation the pivotal orientation about said two axes of rotation of said welding robot body is determined for each point in a desired weld trajectory, and for welding of the second layer onward, calculating for each point in said desired weld trajectory a new position of said welding robot body taking into account a modified length value associated with the separation between the locations of said two axes of rotation of said wrist, the torch tip being displaced in accordance with said calculated value from the desired trajectory.

2. A multi-layer padding welding method using a welding robot having a robot body movable along orthogonal axes, a torch, and a wrist between said robot body and said torch, and wherein said wrist includes two pivoting shafts which pivot in mutually orthogonal directions, and wherein said torch tip may be controlled in accordance with a predetermined constant so as to follow a desired trajectory, said method comprising the steps of:

carrying out a teaching operation in which said torch tip is directed along a desired welding path, and the angular positions of said wrist about said two pivoting shafts, and the position along said orthogonal axes of said robot body are determined for each position along said desired welding path, calculating from said determined values a set of trajectory positions using a constant obtained by determining a distance value associated with the separation between said two pivoting shafts, and thereafter carrying out additional layers of said multi-layer padding welding by, at each layer, computing from said calculated set of trajectory positions a new set of trajectory positions for said robot body utilizing a modified constant, thereby displacing the trajectory of said torch tip by an amount established by said modified constant.

3. A multi-layer padding welding method using a welding robot having a welding wire pivotally mounted at the front end of the arm of a welding robot, said arm front end being controllably movable to a point along orthogonal axes, said method comprising the steps of:

obtaining, during a teaching phase, the pivotal orientation of said welding wire and the position of said front end of the welding robot arm for each point in a desired-weld trajectory, determining the position of the tip of the welding wire at each such position on the trajectory, during said teaching phase, with respect to said orthogonal axes, said tip position being relatable by a certain relationship to said obtained position of the front end of said welding robot arm by a length factor, directing the path of said robot arm during subsequent welding phases by driving, at each point in said trajectory, the welding wire to the same pivotal orientation as obtained during the teaching phase, and by driving the front end of the welding robot arm to a position with respect to said orthogonal axes at which the front end of said arm is related to the welding wire tip position established during said teaching phase by same certain relationship but with said length factor being modified by a constant, whereby by changing only said length factor by a constant on a subsequent welding phase, lap welding along the original welding trajectory, but offset therefrom by a fixed amount, will be obtained.

* * * * *